US010479506B1

United States Patent
Colletti

(10) Patent No.: US 10,479,506 B1
(45) Date of Patent: Nov. 19, 2019

(54) DEPLOYABLE PARTITION SYSTEMS AND METHODS FOR SEAT ASSEMBLIES

(71) Applicant: THE BOEING COMPANY, Chicago, IL (US)

(72) Inventor: Brian Colletti, Mission Viejo, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/989,274

(22) Filed: May 25, 2018

(51) Int. Cl.
  *A47C 7/62* (2006.01)
  *B64D 11/06* (2006.01)
  *B60N 2/90* (2018.01)

(52) U.S. Cl.
  CPC ............ B64D 11/0606 (2014.12); B60N 2/90 (2018.02)

(58) Field of Classification Search
  CPC ............................... B64D 11/0606; B60N 2/90
  USPC ............................. 297/184.1, 184.11, 184.14
  See application file for complete search history.

(56) References Cited

U.S. PATENT DOCUMENTS

| | | | | |
|---|---|---|---|---|
| 4,938,401 A * | 7/1990 | Weisbrodt | ............... | B60R 7/043 108/44 |
| 5,123,707 A * | 6/1992 | Wurzell | .................... | B60N 2/90 297/464 |
| 5,857,745 A | 1/1999 | Matsumiya | | |
| 6,113,183 A * | 9/2000 | Koch | ..................... | B64D 11/06 297/184.1 X |
| 6,644,736 B2 * | 11/2003 | Nguyen | ................. | B64D 11/06 297/184.15 X |
| 7,568,759 B2 * | 8/2009 | Schurg | ................... | B64D 11/06 297/184.1 |
| 7,641,278 B2 * | 1/2010 | Strasser | ................. | B64D 11/06 297/184.1 X |
| 9,216,674 B1 * | 12/2015 | Garib | ....................... | B60N 2/91 |
| 9,567,085 B2 * | 2/2017 | Suzuki | .............. | B64D 11/0606 |
| 9,828,099 B2 * | 11/2017 | Henshaw | ........... | B64D 11/0606 |
| 9,834,308 B2 * | 12/2017 | Henshaw | ........... | B64D 11/0606 |
| 9,956,898 B1 * | 5/2018 | Dellock | .................... | B60N 2/90 |
| 10,059,238 B1 * | 8/2018 | Salter | ....................... | B60N 2/90 |
| 10,131,432 B2 * | 11/2018 | Simeon | .................... | B61D 1/04 |
| 10,279,912 B2 * | 5/2019 | Robinson | ........... | B64D 11/0605 |
| 2001/0000639 A1 * | 5/2001 | Park | ..................... | A47C 1/0352 297/411.3 |
| 2005/0194827 A1 * | 9/2005 | Dowty | ..................... | B60N 2/62 297/411.3 |

(Continued)

FOREIGN PATENT DOCUMENTS

| DE | 19541567 C1 * | 1/1997 | ............. B60N 2/242 |
|---|---|---|---|
| DE | 102008052841 | 5/2010 | |

(Continued)

OTHER PUBLICATIONS

Extended European Search Report for EP 19176079.2-1010, dated Oct. 1, 2019.

*Primary Examiner* — Rodney B White
(74) *Attorney, Agent, or Firm* — Joseph M Butscher; The Small Patent Law Group, LLC

(57) ABSTRACT

A partition system (and method of forming the same) that is configured to be secured to a seat assembly. The partition system includes a barrier that is configured to be moved between a stowed position and a deployed position. The barrier is moveably coupled to an armrest of the seat assembly. The stowed position is proximate to a rear end of the armrest. The deployed position extends towards a front end of the armrest.

23 Claims, 6 Drawing Sheets

(56) References Cited

U.S. PATENT DOCUMENTS

| | | | | |
|---|---|---|---|---|
| 2007/0085389 | A1* | 4/2007 | Schurg | B64D 11/06 |
| | | | | 297/184.1 |
| 2012/0038587 | A1* | 2/2012 | Alford | B64D 11/06 |
| | | | | 345/174 |
| 2014/0077520 | A1 | 3/2014 | McManus | |
| 2015/0274299 | A1* | 10/2015 | Henshaw | B64D 11/0606 |
| | | | | 244/118.6 |
| 2016/0355109 | A1* | 12/2016 | Geraty | B60N 2/90 |
| 2016/0368608 | A1* | 12/2016 | Suzuki | B64D 11/0606 |
| 2017/0015420 | A1* | 1/2017 | Henshaw | B64D 11/0606 |
| 2018/0099753 | A1* | 4/2018 | Hall, Jr. | B64D 11/0606 |
| 2018/0281637 | A1* | 10/2018 | Ott | B60N 2/882 |

FOREIGN PATENT DOCUMENTS

| | | |
|---|---|---|
| EP | 0773134 | 5/1997 |
| EP | 3081490 | 10/2016 |
| FR | 2923773 | 5/2009 |

* cited by examiner

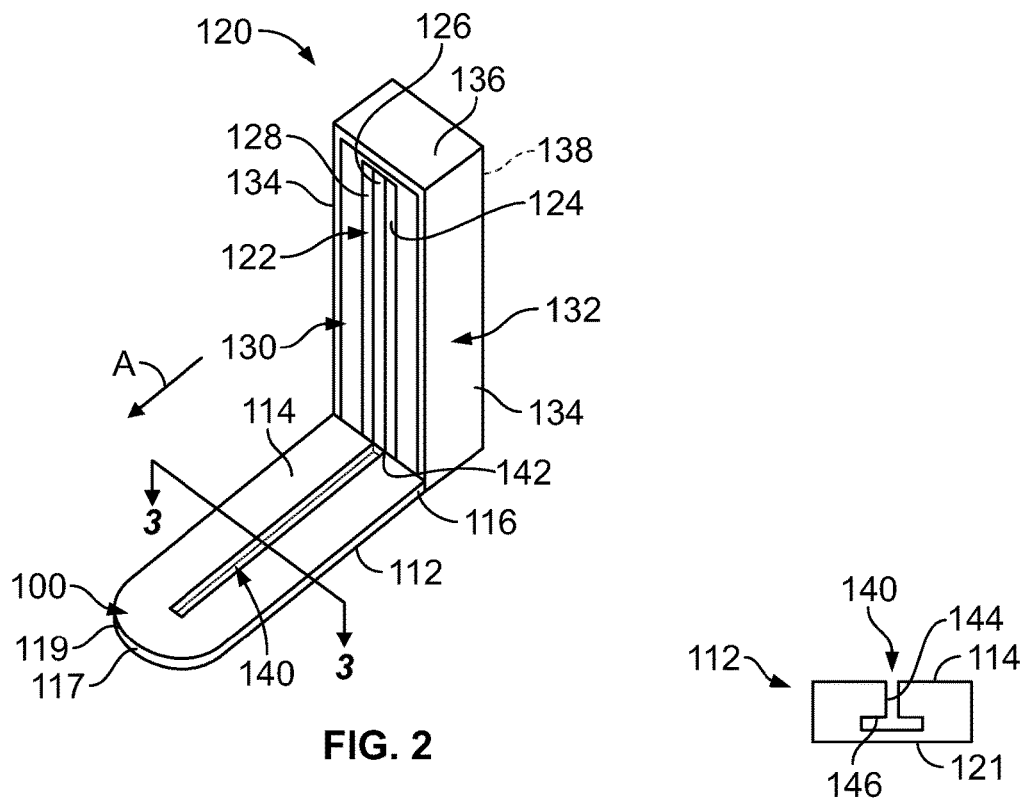
FIG. 2
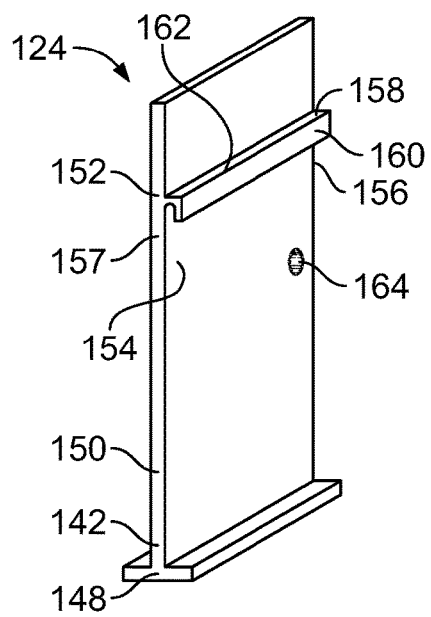
FIG. 3
FIG. 4

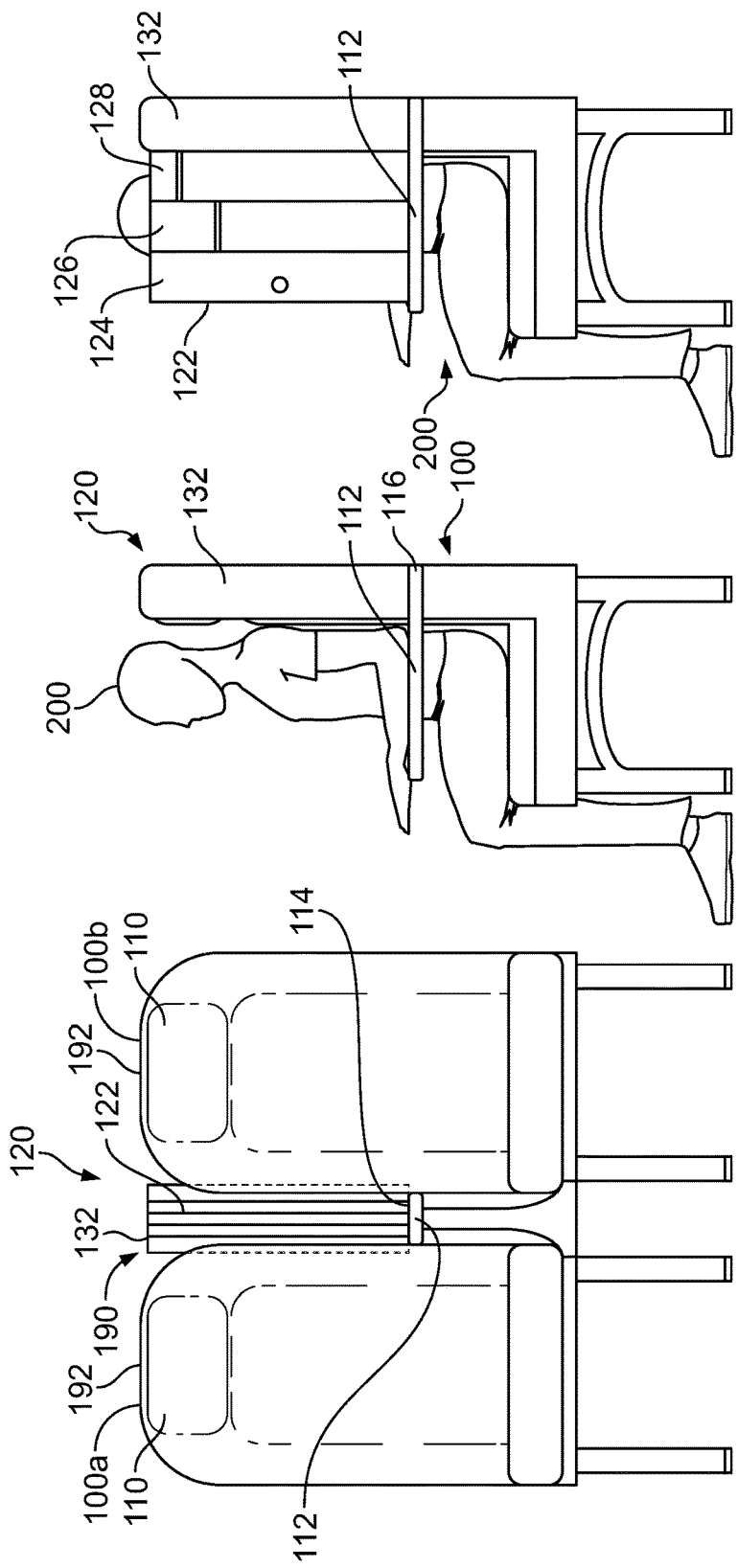

US 10,479,506 B1

DEPLOYABLE PARTITION SYSTEMS AND METHODS FOR SEAT ASSEMBLIES

FIELD OF EMBODIMENTS OF THE DISCLOSURE

Embodiments of the present disclosure generally relate to deployable partition systems and methods for seat assemblies, and, more particularly, to deployable partition systems and methods for seat assemblies within interior cabins of vehicles.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths and/or one or more doors of the aircraft.

Passenger seats are positioned within the interior cabin. In various sections within the interior cabin, adjacent passenger seats may share a common armrest. Passengers seated in adjacent seats may be close to one another. For example, two passengers seated next to one another may find that respective forearms on the common armrest may directly abut against each other. Further, because the two passengers are seated close to one another, privacy is typically minimal.

SUMMARY OF THE DISCLOSURE

A need exists for a system and method of providing increased privacy between passengers seated next to one another in an interior cabin of a vehicle, such as a commercial aircraft.

With that need in mind, certain embodiments of the present disclosure provide a partition system that is configured to be secured to a seat assembly. The partition system includes a barrier that is configured to be moved between a stowed position and a deployed position. The barrier is moveably coupled to an armrest of the seat assembly. The stowed position is proximate to a rear end of the armrest. The deployed position extends towards a front end of the armrest.

In at least one embodiment, the armrest is common to the seat assembly and an adjacent seat assembly. In at least one embodiment, the barrier is mounted to the armrest in a space between the seat assembly and an adjacent seat assembly.

The partition system may include a housing defining an internal chamber. The barrier is in the internal chamber in the stowed position.

The armrest may include a guide track that is configured to receive and moveably retain a portion of the barrier.

In at least one embodiment, the barrier includes a first panel, a second panel, wherein the first panel is moveably coupled to the second panel, and a third panel, wherein the third panel is moveably coupled to the second panel. The first panel may include a first rail that is slidably retained within a first groove of the second panel. The third panel may include a second rail that is slidably retained within a second groove of the second panel. The first groove may be formed in a first side of the panel. The second groove may be formed in a second side of the panel that is opposite from the first side.

The barrier may include an engagement member that is configured to be grasped by an individual.

The barrier may extend to a height of a top of an upright backrest of the seat assembly.

In at least one embodiment, the partition system may include a fixed anchor member, and a moveable member moveably secured to the armrest. The barrier is connected to the fixed anchor member and the moveable member. The barrier may be a flexible structure formed of one or more of a fabric, cloth, mesh, or the like.

In at least one embodiment, the partition system may include a rotatable anchor member, and a moveable member moveably secured to the armrest. The barrier may be connected to the rotatable anchor member and the moveable member. The barrier may wrap around the rotatable anchor member in the stowed position.

Certain embodiments of the present disclosure provide a method of forming a partition system. The method includes moveably coupling a barrier that is configured to be moved between a stowed position and a deployed position to an armrest of a seat assembly. The stowed position is proximate to a rear end of the armrest, and the deployed position extends towards a front end of the armrest. In at least one embodiment, the method includes mounting the barrier to the armrest in a space between the seat assembly and an adjacent seat assembly.

Certain embodiments of the present disclosure provide a vehicle that includes an interior cabin, a first seat assembly within the interior cabin, and a second seat assembly within the interior cabin, in which the first seat assembly is adjacent to the second seat assembly. The first seat assembly and the second seat assembly share an armrest. A partition system is secured to the armrest in a space between the first seat assembly and the second seat assembly. The partition system includes a barrier that is configured to be moved between a stowed position and a deployed position. The stowed position is proximate to a rear end of the armrest, and the deployed position extends towards a front end of the armrest.

BRIEF DESCRIPTION OF THE DRAWINGS

FIG. 2 illustrates a perspective top view of a partition system in a stowed position secured to an armrest of a seat assembly, according to embodiment of the present disclosure.

FIG. 3 illustrates a cross-sectional view of an armrest through line 3-3 of FIG. 2, according to an embodiment of the present disclosure.

FIG. 4 illustrates a perspective lateral view of a first panel, according to an embodiment of the present disclosure.

FIG. 9 illustrates a front view of a partition system secured to a common armrest of adjacent seat assemblies, according to an embodiment of the present disclosure.

FIG. 10 illustrates a seat assembly including a partition system in a stowed position, according to an embodiment of the present disclosure.

FIG. 11 illustrates a seat assembly including a partition system in a deployed position, according to an embodiment of the present disclosure.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a partition system for a seat assembly, such as within an interior cabin of an aircraft. The partition system is configured to be moveable between a stowed position and a deployed position. In the deployed position, the partition system provides a moveable barrier between two seated passengers. The barrier may include a plurality of panels, a fabric screen, a mesh screen, and/or the like. The barrier may extend from an armrest to a top of a backrest. In the deployed position, the barrier prevents a neighboring passenger from contacting a passenger. In at least one embodiment, the partition system mounts in a space between seat assemblies. For example, the partition system may be secured to an armrest that is common to two seat assemblies.

Certain embodiments of the present disclosure provide a partition system that is configured to be secured to a seat assembly. The partition system includes a barrier that is configured to be moved between a stowed position and a deployed position. The barrier is moveably secured to an armrest of the seat assembly. The stowed position is proximate to a rear end of the armrest. The deployed position extends towards a front end of the armrest. For example, the deployed position may extend the barrier between the rear end of the armrest to a location proximate to an outer edge of the front end of the armrest.

The armrest may be common to the seat assembly and another, adjacent seat assembly. The barrier may be mounted to the armrest in a space between the seat assembly and the adjacent seat assembly.

Figure 1:
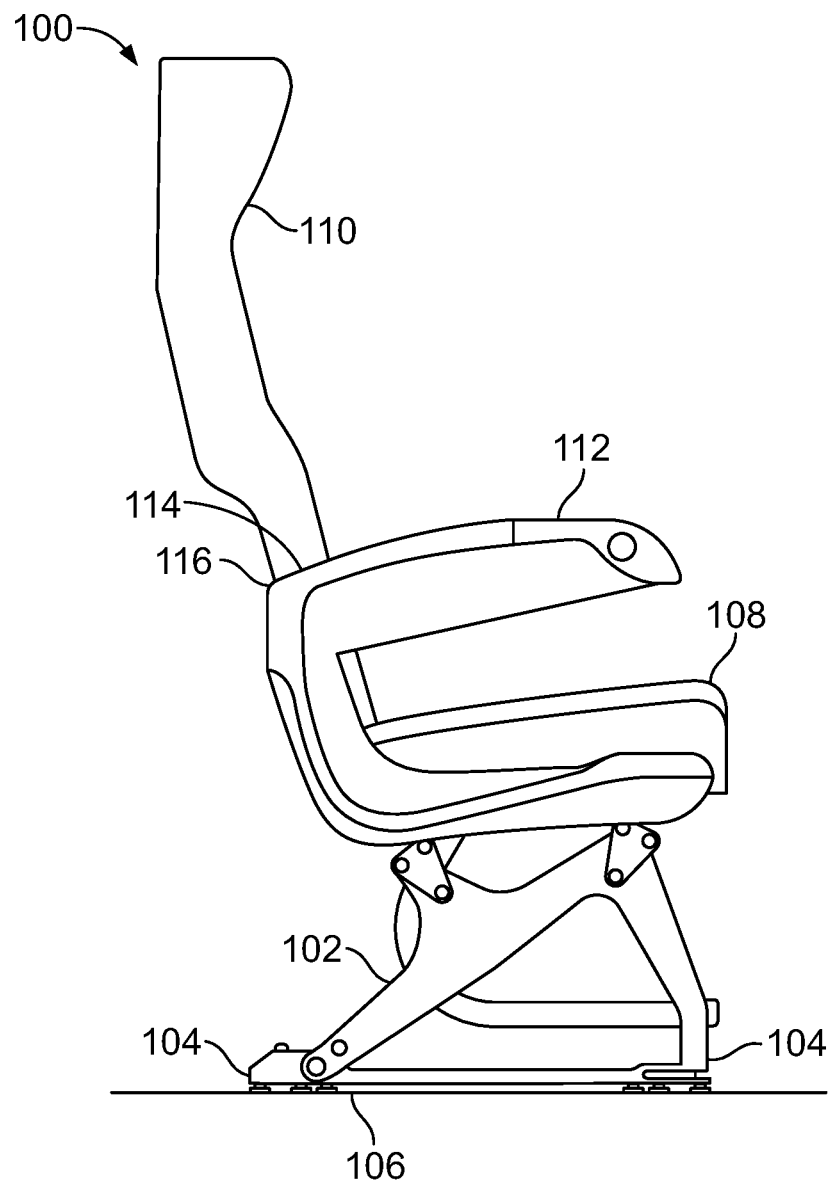
FIG. 1 illustrates a side view of a seat assembly, according to an embodiment of the present disclosure.

FIG. 1 illustrates a side view of a seat assembly 100, according to an embodiment of the present disclosure. The seat assembly 100 may be configured to be secured within an interior cabin of a vehicle, such as a commercial aircraft. The seat assembly 100 includes a base 102, which may include legs 104 that may be secured to tracks 106 within an interior cabin of a vehicle. The legs 104 may include fittings, fasteners, or the like that are configured to securely connect the legs 104 to the tracks 106. The base 102 supports a seat cushion 108 and a backrest 110. Armrests 112 may be pivotally secured to the backrest 110 and/or the base 102.

As described herein, a partition system may be secured to the seat assembly 100. For example, the partition system may be mounted onto a top 114 of the armrest 112 proximate to a rear end 116. The partition system is configured to be selectively moved between a stowed position and a deployed position, in which the partition system provides a barrier that extends along a length of the armrest 112.

The seat assembly 100 may include more or less components than shown. Further, the seat assembly 100 may have a different shape and size than shown. It is to be understood that the seat assembly 100 shown in FIG. 1 is merely one example of a seat assembly.

FIG. 2 illustrates a perspective top view of a partition system 120 in a stowed position secured to an armrest 112 of a seat assembly 100, according to embodiment of the present disclosure. For the sake of clarity, only the armrest 112 of the seat assembly 100 is shown in FIG. 2.

The partition system 120 includes a barrier 122. As shown in FIG. 2, the barrier 122 is in the stowed position. In at least one embodiment, the barrier 122 includes a first panel 124 moveably coupled to a second panel 126, which, in turn, is moveably coupled to a third panel 128. Each of the first panel 124, the second panel 126, and the third panel 128 may be formed of a rigid material, such as a plastic.

In the stowed position, the first panel 124, the second panel 126, and the third panel 128 may be contained within an internal chamber 130 of a housing 132. The housing 132 includes lateral walls 134 connected to a top wall 136 and a rear wall 138. The internal chamber 130 is defined between the lateral walls 134, the top wall 136, the rear wall 138, the top 114 of the armrest 112, and/or a base of the housing 132. The housing 132 may be secured to the armrest 112 through fasteners, adhesives, and/or the like. In at least one embodiment, the housing 132 may be integrally formed with the armrest 112. Optionally, the partition system 120 may not include the housing 132. Instead, the barrier 122 may be exposed in the stowed position at the rear end 116 of the armrest 112.

A guide track 140 is formed through the top 114 of the armrest 112. The guide track 140 may include a channel extending along the top 114 of the armrest 112 from the rear end 116 towards an opposite front end 117. As shown, the guide track 140 may not extend through the front end 117. Instead, the guide track 140 may terminate proximate to an outer edge 119 of the front end 117.

The guide track 140 is aligned with the first panel 124. The guide track 140 is configured to receive and moveably retain a base 142 of the first panel 124.

FIG. 3 illustrates a cross-sectional view of the armrest 112 through line 3-3 of FIG. 2, according to an embodiment of the present disclosure. The guide track 140 is formed through the top 114 and extends towards a bottom 121 of the armrest 112. The guide track 140 includes a vertical channel 144 that connects to a retaining channel 146, thereby forming an inverted T shape. The guide track 140 receives and moveably retains the base 142 of the first panel 124.

FIG. 4 illustrates a perspective lateral view of the first panel 124, according to an embodiment of the present disclosure. The first panel 124 includes the base 142, which includes a flat ledge 148.

A planar wall 150 extends upwardly from the ledge 148. A rail 152 extends outwardly from a side 154 of the wall 150. The rail 152 may extend between a first end 156 and an opposite second end 157 of the first panel 124. The rail 152 includes an extension beam 158 and a hook 160 downwardly extending from an edge 162 of the extension beam 158.

An engagement member 164, such as an open hole, is formed through the wall 150 proximate to the first end 156. The engagement member 164 is configured to be grasped by an individual to move the first panel 124 between the stowed position and the deployed position. Optionally, the engagement member 164 may be or include a handle, knob, recessed area, or other like that is configured to be grasped by an individual.

Referring to FIGS. 2-4, the base 142 is configured to be received and moveably retained by the guide track 140. In particular, the flat ledge 148 is configured to be received and moveably retained within retaining channel 146, while a lower portion of the wall 150 is received and moveably retained within the vertical channel 144. In this manner, the guide track 140 stabilizes the barrier 122 in the deployed position. Optionally, additional guide tracks may be formed in the armrest 112 and aligned with the second panel 126 and the third panel 128, which may include portions that are configured to be received and moveably retained within the additional guide tracks.

Figure 5:
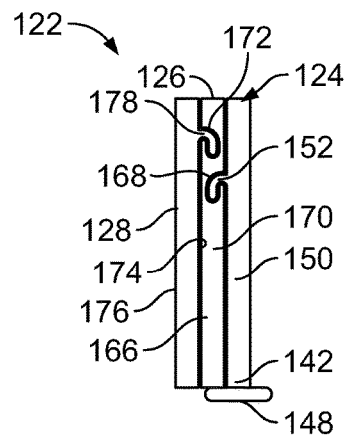
FIG. 5 illustrates an end view of a barrier in a stowed position, according to an embodiment of the present disclosure.

FIG. 5 illustrates an end view of the barrier 122 in the stowed position, according to an embodiment of the present disclosure. The second panel 126 includes a wall 166 having a first groove 168 formed in a first side 170 and a second groove 172 formed in an opposite second side 174. The second groove 172 may be at a height that is above the first groove 168.

The third panel 128 includes a wall 176 having rail 178 extending towards the second panel 126. The rail 178 may be similar to the rail 152 of the first panel 124.

The rail 152 is slidably retained within the reciprocal first groove 168 of the second panel 126, thereby moveably securing the first panel 124 to the second panel 126. Similarly, the rail 178 is slidably retained within the reciprocal second groove 172 of the second panel 126, thereby moveably securing the second panel 126 to the third panel 128.

Referring again to FIG. 2, in order to move the barrier 122 from the stowed position to a deployed position, an individual grasps the first panel 124, such as via the engagement member 164, and outwardly pulls the first panel 124 towards the front end 117 of the armrest 112 in the direction of arrow A. As the first panel 124 is outwardly pulled towards the front end 117, the base 142 is received and moveably retained by the guide track 140 of the armrest 112, which guides and stabilizes the barrier 122 into the deployed position. With continued movement of the first panel 124 towards the front end 117, the second panel 126 moves in response thereto, such as via the slidable engagement of the rail 152 within the first groove 168. As the first panel 124 and the second panel 126 move towards the front end 117, the third panel 128 moves in response thereto, such as via the slidable engagement of the rail 178 within the second groove 172. As such, the first panel 124, the second panel 126, and the third panel 128 linearly translate over a length of the armrest 112 between the stowed position and the deployed position.

Figure 6:
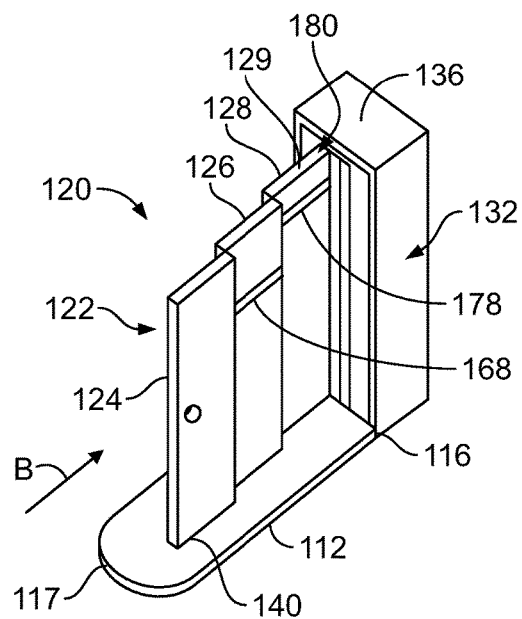
FIG. 6 illustrates a perspective top view of the partition system in a deployed position, according to an embodiment of the present disclosure.

FIG. 6 illustrates a perspective top view of the partition system 120 in a deployed position, according to an embodiment of the present disclosure. As shown, the barrier 122 is fully extended towards the front end 117 of the armrest 112. The length of the guide track 140 extending along a length of the armrest 112 limits the outward extension of the barrier 122, and also prevents or otherwise reduces the potential of the first panel 124, the second panel 126, and the third panel 128 separating from one another.

In at least one embodiment, the top wall 136 of the housing 132 may include an interior groove 180 that slidably retains at least a portion of a top edge 129 of the third panel 128. The retention of the portion of the top edge 129 of the third panel 128 provides additional stability to the barrier 122 in the deployed position.

In order to move the barrier 122 from the deployed position to the stowed position (as shown in FIG. 2), an individual pushes the first panel 124 back towards the rear end 116 of the armrest 112 in the direction of arrow B. As the first panel 124 slides back towards the housing 132, the first panel 124 slides back over the second panel 126, which slides back over the third panel 128, thereby collapsing the barrier 122 into the stowed position.

Figure 7:
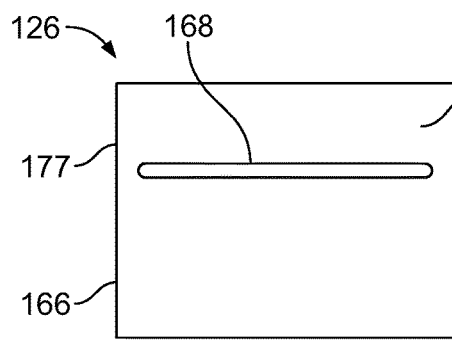
FIG. 7 illustrates a first side view of a second panel, according to an embodiment of the present disclosure.
Figure 8:
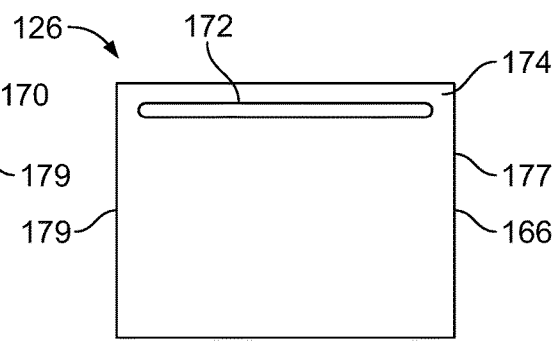
FIG. 8 illustrates a second side view of the second panel, according to an embodiment of the present disclosure.

FIG. 7 illustrates a first side view of the second panel 126. FIG. 8 illustrates a second side view of the second panel 126. Referring to FIGS. 2-8, the first groove 168 and the second groove 172 are formed in opposite sides 170 and 174, respectively, of the wall 166. The first groove 168 and the second groove 172 may not extend to terminal edges 177 and 179 of the wall 166. As such, the first groove 168 and the second groove 172 limit range of motion of the rail 152 and the rail 178, and prevent the first panel 124 and the third panel 128 from separating from the second panel 126. Alternatively, the first groove 168 and the second groove 172 may extend to and through the terminal edges 177 and 179.

FIG. 9 illustrates a front view of the partition system 120 secured to a common armrest 112 of adjacent seat assemblies 100a and 100b, according to an embodiment of the present disclosure. As shown, the partition system 120 is supported on the armrest 112 in a space 190 between the backrests 110 (in the upright positions) of the seat assemblies 100a and 100b. The armrest 112 is a common armrest that is shared by the first seat assembly 100a and the second seat assembly 100b. The partition system 120 is coupled to the armrest 112. The barrier 122 extends from the top 114 of the armrest 112 to a height proximate to a top 192 of the upright backrests 110. In at least one embodiment, the barrier 122 extends to the top 192 of the upright backrests 110. In at least one other embodiment, the barrier 122 may extend above or below the top 192 of the upright backrests 110.

In at least one embodiment, the first seat assembly 100a is configured to be within an interior cabin of a vehicle. The second seat assembly 100b is also configured to be within the interior cabin.

FIG. 10 illustrates the seat assembly 100 including the partition system 120 in the stowed position, according to an embodiment of the present disclosure. The barrier 122 (shown in FIGS. 2, 4, and 6) is collapsed and positioned over the rear end 116 of the armrest 112. As such, the stowed barrier 122 does not obstruct a view to a passenger FIG. 11 illustrates the seat assembly including the partition system 120 in the deployed position, according to an embodiment of the present disclosure. As shown, the barrier 122 is fully and outwardly extended over a length of the armrest 112, thereby blocking a view to an upper portion of the passenger 200. The extended barrier 122 also serves to block the passenger 200 from directly contacting an adjacent passenger, such as on or otherwise over the armrest 112.

Figure 12:
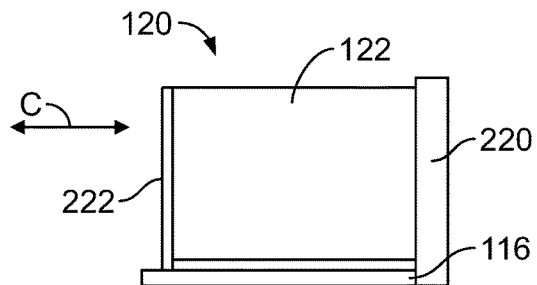
FIG. 12 illustrates a lateral view of a partition system in a deployed position, according to an embodiment of the present disclosure.

FIG. 12 illustrates a lateral view of a partition system 120 in a deployed position, according to an embodiment of the present disclosure. In this embodiment, the partition system 120 includes a fixed anchor member 220 (such as a post, beam, bracket, or the like) secured to the armrest 112 proximate to the rear end 116. A moveable member 222 (such as a post, beam, bracket, or the like) is moveably secured to the armrest 112, such as through a reciprocal guide track. The moveably member 222 is configured to move towards and away from the fixed anchor member 220 over the armrest 112 in the directions or arrows C. A barrier 122 is secured to the fixed anchor member 220 and the moveable member 222. In this embodiment, the barrier 122 may be a flexible structure, such as a fabric, cloth, mesh, or the like. In the deployed position, the barrier 122 is fully extended and taut.

Figure 13:
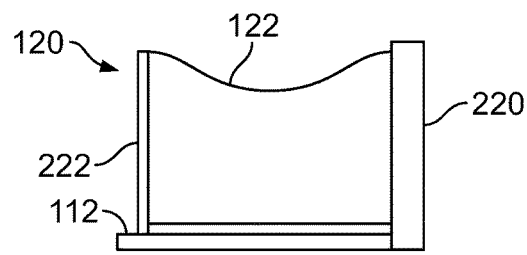
FIG. 13 illustrates a lateral view of a partition system in an intermediate position, according to an embodiment of the present disclosure.

FIG. 13 illustrates a lateral view of the partition system 120 in an intermediate position, according to an embodiment of the present disclosure. In order to move the partition system 120 into the stowed position, the moveable member 222 is pushed inwardly toward the fixed anchor member 220, thereby slackening the barrier 122.

Figure 14:
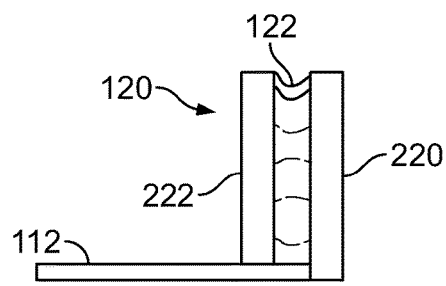
FIG. 14 illustrates a lateral view of a partition system in a stowed position, according to an embodiment of the present disclosure.

FIG. 14 illustrates a lateral view of the partition system 120 in the stowed position, according to an embodiment of the present disclosure. As shown, the moveable member 222 may be proximate to the fixed anchor member 220, and the barrier 122 may be draped therebetween and/or around portions of the fixed anchor member 220 and/or the moveable member 222.

Figure 15:
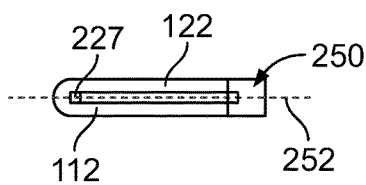
FIG. 15 illustrates a top view of a partition system in a deployed position, according to an embodiment of the present disclosure.

FIG. 15 illustrates a top view of a partition system 120 in a deployed position, according to an embodiment of the present disclosure. The partition system 120 includes a moveable member 222 as described above with respect to FIGS. 12-14. The moveable member 222 is moveably secured to the armrest 112 via a guide track. A rotatable anchor member 250 is positioned proximate to the rear end 116 of the armrest 112. The anchor member 250 is configured to rotate about an axis 252. The barrier 122 may be a flexible barrier, such as formed of fabric, cloth, mesh, and/or the like.

Figure 16:
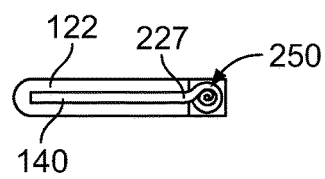
FIG. 16 illustrates a top view of a partition system in a stowed position, according to an embodiment of the present disclosure.

FIG. 16 illustrates a top view of the partition system 120 in a stowed position, according to an embodiment of the present disclosure. As the moveable member 222 moves through the guide track 140 towards the anchor member 250, the anchor member 250 rotates about the axis 252, thereby wrapping the flexible barrier 122 around the anchor member 250.

Figure 17:
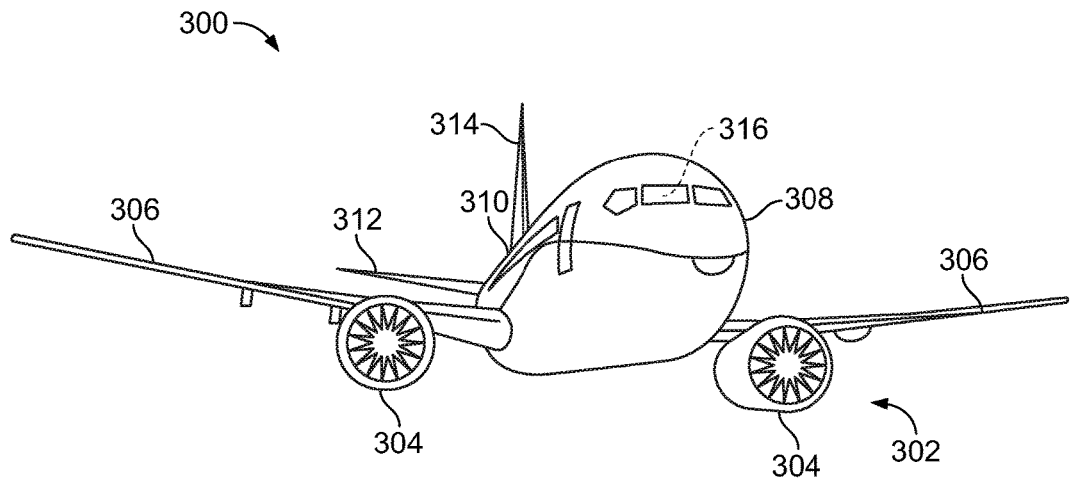
FIG. 17 illustrates a front perspective view of a vehicle, according to an embodiment of the present disclosure.

FIG. 17 illustrates a front perspective view of a vehicle, such as an aircraft 300, according to an embodiment of the present disclosure. The aircraft 300 includes a propulsion system 302 that may include two turbofan engines 304, for example. Optionally, the propulsion system 302 may include more engines 304 than shown. The engines 304 are carried by wings 306 of the aircraft 300. In other embodiments, the engines 304 may be carried by a fuselage 308 and/or an empennage 310. The empennage 310 may also support horizontal stabilizers 312 and a vertical stabilizer 314.

The fuselage 308 of the aircraft 300 defines an interior cabin 316, which may include a cockpit, one or more work sections (for example, galleys, personnel carry-on baggage areas, and the like), one or more passenger sections (for example, first class, business class, and coach sections), and an aft section. The interior cabin 316 includes seat assemblies 100 having partition systems 120, such as shown and described with respect to FIGS. 1-16. Alternatively, instead of an aircraft, embodiments of the present disclosure may be used with various other vehicles, such as automobiles, buses, locomotives and train cars, seacraft, spacecraft, and the like.

Figure 18:
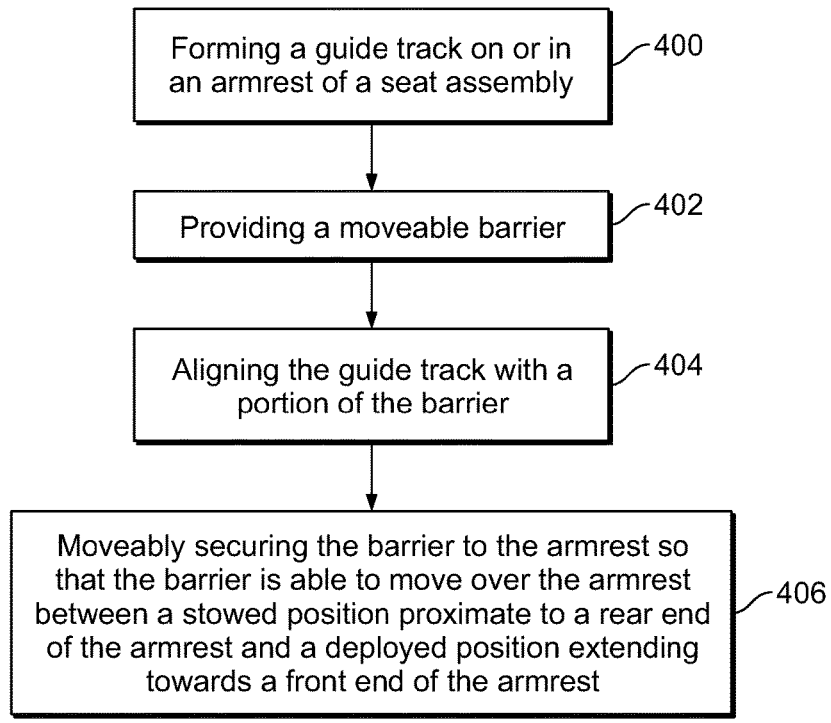
FIG. 18 illustrates a flow chart of a method of forming a partition system, according to an embodiment of the present disclosure.

FIG. 18 illustrates a flow chart of a method of forming a partition system, according to an embodiment of the present disclosure. Referring to FIGS. 1-18, in at least one embodiment, the method may begin at 400 by forming the guide track 140 on and/or in the armrest 112 of the seat assembly 100. At 402, a moveable barrier 122 is provided. At 404, the guide track 140 is aligned with a portion of the barrier 122, so that the portion of the barrier 122 may be received and moveably retained by the guide track 140. At 406, the barrier 122 is moveably secured to the armrest 112 so that the barrier 122 is able to move over the armrest 112 between a stowed position at or otherwise proximate to a rear end 116 of the armrest 112 and a deployed position extending toward a front end 117 of the armrest 112.

As described herein, embodiments of the present disclosure provide systems and methods of providing increased privacy between passengers seated next to one another in an interior cabin of a vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(1), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A partition system that is configured to be secured to a seat assembly, the partition system comprising:
    a barrier that is configured to be moved between a stowed position and a deployed position, the barrier being moveably coupled to an armrest of the seat assembly, wherein the stowed position is proximate to a rear end of the armrest, and wherein the deployed position extends towards a front end of the armrest, wherein the barrier comprises:
    a first panel;
    a second panel, wherein the first panel is moveably coupled to the second panel, and
    a third panel, wherein the third panel is moveably coupled to the second panel,
    wherein the first panel, the second panel, and the third panel are configured to linearly translate over a length of the armrest between the stowed position and the deployed position.

2. The partition system of claim 1, wherein the armrest is common to the seat assembly and an adjacent seat assembly.

3. The partition system of claim 1, wherein the barrier is mounted to the armrest in a space between the seat assembly and an adjacent seat assembly.

4. The partition system of claim 1, further comprising a housing defining an internal chamber, wherein the barrier is in the internal chamber in the stowed position.

5. The partition system of claim 1, wherein the armrest comprises a guide track that is configured to receive and moveably retain a portion of the barrier.

6. The partition system of claim 1, wherein the first panel comprises a first rail that is slidably retained within a first groove of the second panel, and wherein the third panel comprises a second rail that is slidably retained within a second groove of the second panel.

7. The partition system of claim 6, wherein the first groove is formed in a first side of the panel, and wherein the second groove is formed in a second side of the panel that is opposite from the first side.

8. The partition system of claim 1, wherein the barrier comprises an engagement member that is configured to be grasped by an individual.

9. The partition system of claim 1, wherein the barrier extends to a height of a top of an upright backrest of the seat assembly.

10. The partition system of claim 1, wherein the barrier further includes a flexible structure formed of one or more of a fabric, cloth, or mesh.

11. A vehicle comprising:
    an interior cabin;
    a first seat assembly within the interior cabin;
    a second seat assembly within the interior cabin, the first seat assembly being adjacent to the second seat assembly, wherein the first seat assembly and the second seat assembly share an armrest; and
    a partition system secured to the armrest in a space between the first seat assembly and the second seat assembly, the partition system comprising a barrier that is configured to be moved between a stowed position and a deployed position, wherein the stowed position is proximate to a rear end of the armrest, wherein the deployed position extends towards a front end of the armrest, wherein the barrier comprises:
    a first panel;
    a second panel, wherein the first panel is moveably coupled to the second panel; and
    a third panel, wherein the third panel is moveably coupled to the second panel,
    wherein the first panel, the second panel, and the third panel are configured to linearly translate over a length of the armrest between the stowed position and the deployed position.

12. The vehicle of claim 11, wherein the partition system further comprises a housing defining an internal chamber, wherein the barrier is in the internal chamber in the stowed position.

13. The vehicle of claim 1, wherein the
    first panel includes a first rail and an engagement member that is configured to be grasped by an individual,
    wherein the second panel includes a first groove on a first side and a second groove on a second side that is opposite the first side, wherein the first rail is slidably retained within the first groove, and
    wherein the third panel includes a second rail slidably retained with the second groove.

14. A partition system that is configured to be secured to a seat assembly, the partition system comprising:
    a barrier that is configured to be moved between a stowed position and a deployed position, the barrier being moveably coupled to an armrest of the seat assembly, wherein the stowed position is proximate to a rear end of the armrest, and wherein the deployed position extends towards a front end of the armrest, wherein the barrier comprises:
    a first panel including a first rail;
    a second panel including a first groove and second groove, wherein the first groove slidably retains the first rail, wherein the first panel is moveably coupled to the second panel; and
    a third panel including a second rail that is slidably retained within the second groove, wherein the third panel is moveably coupled to the second panel.

15. The partition system of claim 14, wherein the armrest is common to the seat assembly and an adjacent seat assembly.

16. The partition system of claim 14, wherein the barrier is mounted to the armrest in a space between the seat assembly and an adjacent seat assembly.

17. The partition system of claim 14, further comprising a housing defining an internal chamber, wherein the barrier is in the internal chamber in the stowed position.

18. The partition system of claim 14, wherein the armrest comprises a guide track that is configured to receive and moveably retain a portion of the barrier.

19. The partition system of claim 14, wherein the first groove is formed in a first side of the panel, and wherein the second groove is formed in a second side of the panel that is opposite from the first side.

20. The partition system of claim 14, wherein the barrier comprises an engagement member that is configured to be grasped by an individual.

21. The partition system of claim 14, wherein the barrier extends to a height of a top of an upright backrest of the seat assembly.

22. The partition system of claim 14, wherein the barrier includes a flexible structure formed of one or more of a fabric, cloth, or mesh.

23. A partition system that is configured to be secured to a seat assembly, the partition system comprising:
- a barrier that is configured to be moved between a stowed position and a deployed position, the barrier being moveably coupled to an armrest of the seat assembly, wherein the stowed position is proximate to a rear end of the armrest, and wherein the deployed position extends towards a front end of the armrest;
- a rotatable anchor member; and
- a moveable member moveably secured to the armrest, wherein the barrier is connected to the rotatable anchor member and the moveable member, and wherein the barrier wraps around the rotatable anchor member in the stowed position.

* * * * *